Figure 1:
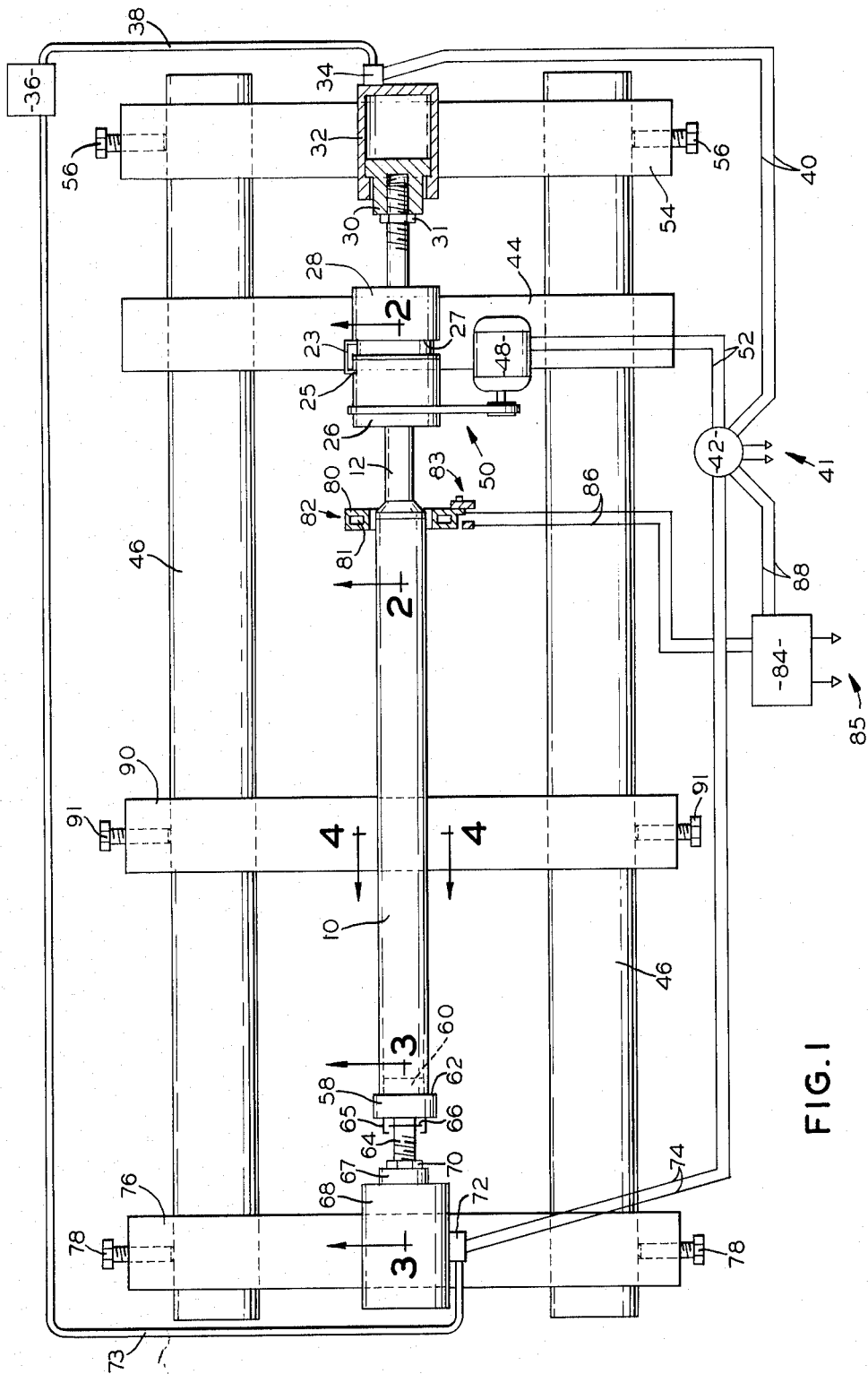

June 7, 1966  H. L. BECKER  3,254,404

METHOD FOR BUTT WELDING

Filed March 19, 1962  4 Sheets-Sheet 1

June 7, 1966  H. L. BECKER  3,254,404
METHOD FOR BUTT WELDING

Filed March 19, 1962  4 Sheets-Sheet 3

United States Patent Office 3,254,404
Patented June 7, 1966

3,254,404
METHOD FOR BUTT WELDING
Harold L. Becker, Perkiomenville, Pa., assignor to Dana Corporation, Toledo, Ohio, a corporation of Virginia
Filed Mar. 19, 1962, Ser. No. 180,625
1 Claim. (Cl. 29—479)

This invention relates generally to the art of welding and more specifically to a method for butt welding universal joint fittings and the like to a tubular shaft in the preparation of a propeller shaft assembly for use in transmitting torque.

Many prior art methods exist for butt welding fittings to a tubular shaft, the most common being placing the shaft component and the fitting component in adjacent relationship and arc welding the same into an integral assembly. This method leaves much to be desired since it is relatively expensive, slow, the heat generated in the welding operation distorts the assembled components and causes undesirable structural changes in the material, and weld spatter impinges the components adjacent the weld and necessitates the removal thereof or masking of the components.

Another method for welding together components of the above nature comprises abutting the adjacent ends of the components while rotating the same relative to each other at high rotational velocities while under moderate pressure to produce heat and then pressing the ends together under very high pressure to complete the weld. This mehtod is undesirable to practice in that the velocities involved are extremely high so that the mechanisms used in the process are complex and expensive, the irregularities in the dimensions of the components or non-parallelism of the abutting surfaces results in non-uniform heating, and there is a great tendency for hot cracks to occur from the premature welding which takes place while relative rotation is still continuing.

A further prior art method of welding tubular components discloses placing the components in adjoining relationship, surrounding the junction with an induction coil and heating the adjoining surfaces by induction while applying pressure thereto. This method is more satisfactory than arc welding, since it is much cleaner, faster, and does not subject the adjacent portions of the components to undesirable heating. However, this mehtod is undesirable in that with components held stationary in the induction coil, there is a great tendency for non-uniform heating about the circumference due both to misalignment in coupling distance between the coil and the components and the fact that the induction coil will not heat uniformly around its circumference (since the coil must be of the split type to allow removal of the assembly and the coil at the split and at the junction of the coil halves will not provide a satisfactory heating effect), and also if the components are not the same radial cross section the heating effect to the components will not be equal.

A further disadvantage of the above last mentioned method is that the weld, when completed, projects both above and below the tubular components and, therefore, if the method is used in welding joint fittings to a tubular shaft to form an assembly such as a propeller shaft, the portion of the weld projecting radially within the tube will interfere with a universal joint fitting prepared in a normal manner having a butt or pilot portion pressed into the tubular shaft.

It is, therefore, an object of this invention to provide a new and improved method for welding a fitting to a tubular shaft.

It is another object of this invention to provide a method for welding a universal joint fitting to a tubular shaft whereby the weld obtained does not interfere with the usual press fit between the fitting and the tubular shaft.

It is yet another object of this invention to provide a method for welding a fitting to a tubular shaft wherein weld spatter is eliminated and undesirable heat and distortion are minimized.

It is a further object of this invention to provide a method for welding a fitting to a tubular shaft wherein circumferential heating and welding effects are uniform.

Yet another object of this invention is to provide a method adapted for the welding together of a tubular shaft member and an annular member wherein the annular member has an original radial thickness that is greater in the vicinity of the proposed weld than the tubular shaft member.

A still further object of this invention is to provide a method adapted for the welding together of a tubular shaft member and an annular member of greater radial thickness than the tubular member by preparing a portion of the annular member to substantially correspond to the tubular member in diameter and radial thickness while providing radial clearance on both sides of said portion so that said tubular member and said portion can be heated uniformly and the weldment arising from pressing the components together is radially unconfined.

Various other objects, features and advantages of this invention will appear from the description given below taken in conjunction with the accompanying drawings, illustrating by way of example preferred forms of the invention.

Figure 2:
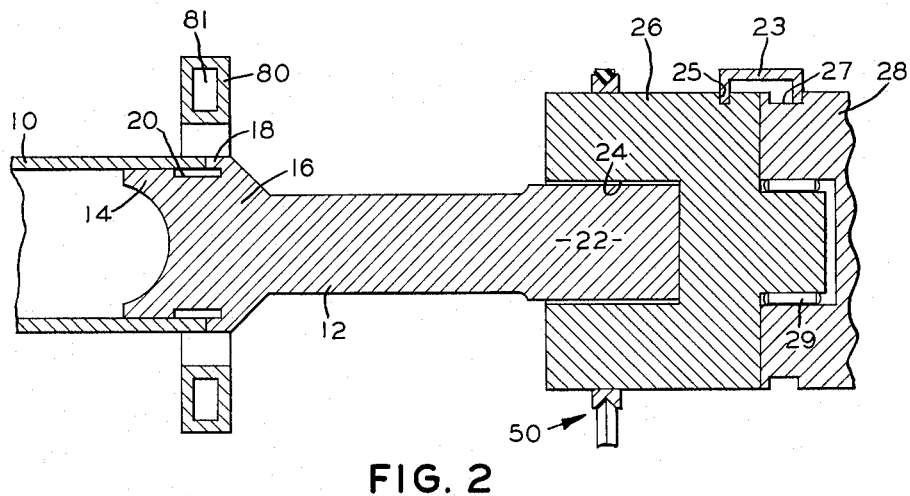
Figures 3, 4:
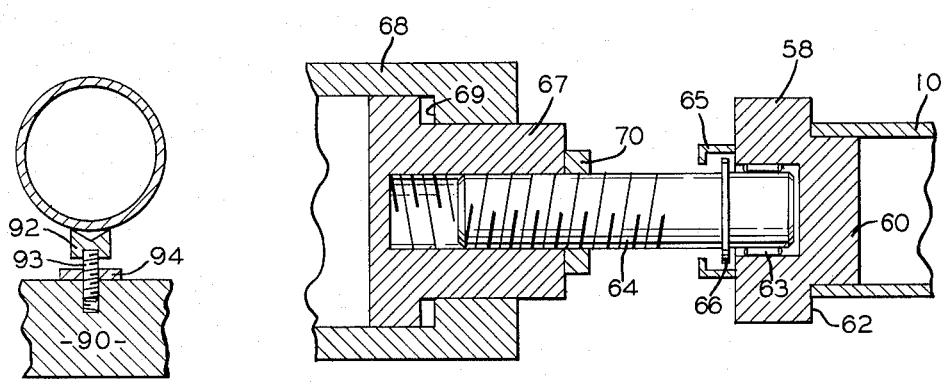
Figure 5:
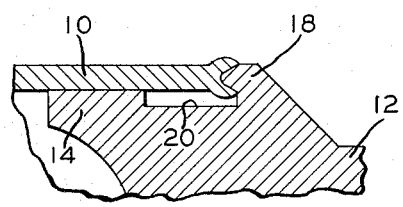
Figure 6:
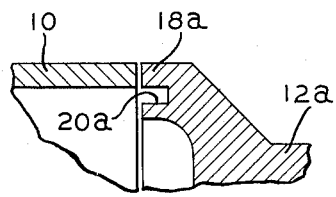
Figure 7:
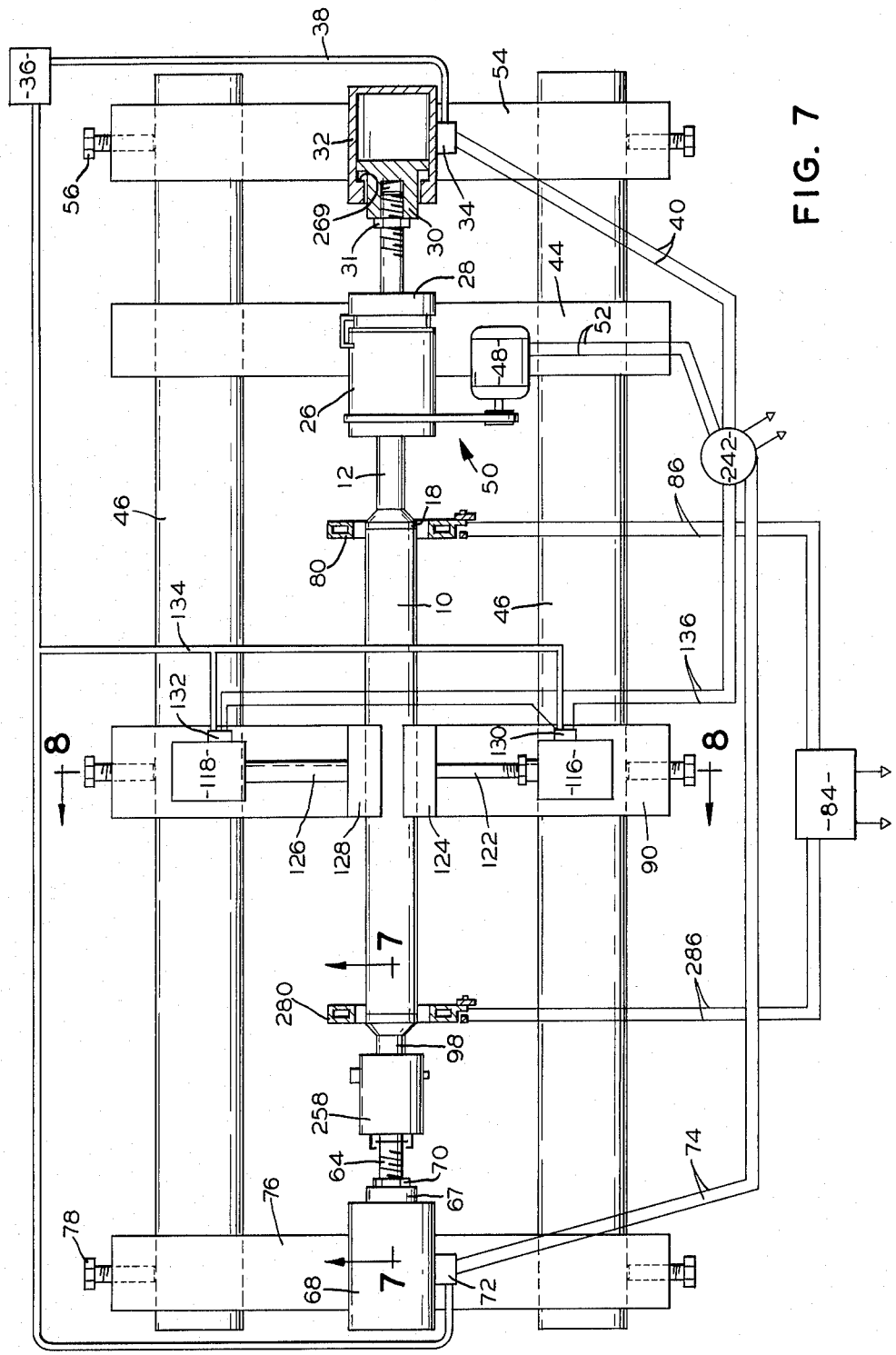
Figure 8:
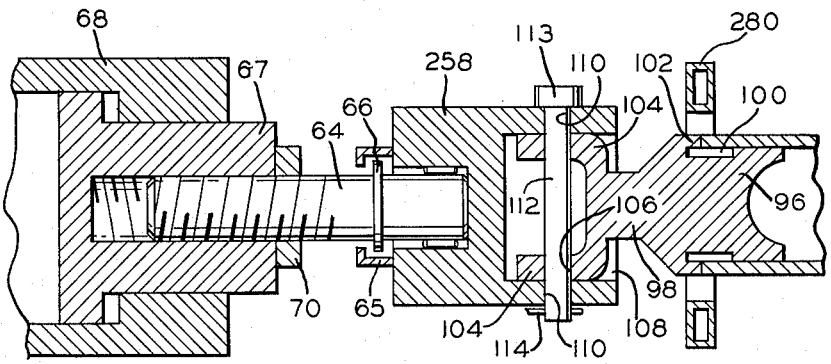
Figure 9:
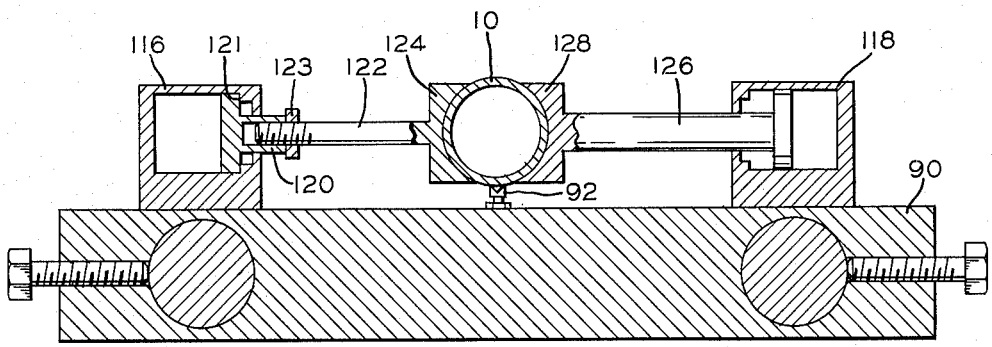

In the drawings:
FIG. 1 is a partial schematic plan view parts of which are shown in section of an arrangement of apparatus for carrying out the invention;
FIG. 2 is a sectional view taken along the line 2—2 of FIG. 1;
FIG. 3 is a sectional view taken along the line 3—3 of FIG. 1;
FIG. 4 is a sectional view taken along the line 4—4 of FIG. 1;
FIG. 5 is a sectional view of a portion of the components shown in FIG. 2 after the components have been welded by this method;
FIG. 6 is a longitudinal sectional view of a portion of a structure showing another manner of preparing the components for welding by this invention;
FIG. 7 is a partial schematic view of another arrangement of apparatus for carrying out this invention;
FIG. 8 is a longitudinal sectional view taken along the line 8—8 of FIG. 7; and
FIG. 9 is a longitudinal sectional view taken along the line 9—9 of FIG. 7.

Referring now to the drawings, and more particularly to FIGS. 1, 2 and 3, a tubular shaft 10 is shown adapted to be welded to a fitting 12 in the form of a stub shaft. It is understood that other types of fittings are within the contemplation of this invention.

A pilot or butt 14 of the stub shaft 12 is shown pressed into the shaft 10 and engages the same in an interfering fit relationship. The enlarged end 16 of the stub shaft 12 is prepared with an anular flange 18 substantially equal in diameter and radial thickness to the tubular shaft 10. The flange 18 is obtained by providing a relieved area in the form of an undercut 20 in the butt 14 and enlarged end 16 of the stub shaft 12. The undercut 20 may be provided by machining the same in a fitting having a butt originally formed with a uniform diameter or by casting or forging the undercut when the fitting is originally made.

The splined end 22 of the stub shaft 12 is received for unitary rotation in a registering splined opening 24 in a driving support 26. The support 26 is rotatably mounted in a piston extension 28 which assembly is provided with an annulus of roller bearings 29 interposed therebetween to reduce friction. A U-shaped clamp 23 is received in a detent 25 in the support 26 and in an annular groove 27 in the extension 28 to prevent the support and extension from separating axially. The piston extension 28 is threadedly received by a piston 30 of a pressure fluid operated servo-motor 32. The extension 28 is axially adjustable relative to the piston 30 and a lock nut 31 is threaded on the extension 28 and adapted to engage the piston 30 to secure the adjustment thereof. The servo-motor 32 is of the well known double-acting type and is controlled by a solenoid 34 which controls the flow of pressure fluid received by the servo-motor 32 from a source of fluid pressure 36 through a fluid passage line 38. The solenoid is connected to a timer 42 through power lines 40; the solenoid receiving energizing power from a source of power 41.

The piston extension 28 is secured in a suitable manner to a carrier platform 44 which platform is slidably mounted on a pair of spaced ways 46 and adapted to move axially unitarily with the extension 28. An electric motor 48 is suitably secured to the platform 44 and drivingly connected to the driving support 26 by a belt and pulley arrangement shown generally at 50. The motor 48 is connected to power lines 52 and is energized therethrough by the timer 42.

The servo-motor 32 is fixedly secured in a suitable manner to a platform 54, which platform is slidably mounted on the ways 46 and adapted to be fixedly positioned relative thereto by means of a pair of set screws 56 threadedly received in the platform 54 and engaging the ways 46 at their inner ends. The position of the platform 54 is adjusted in accordance with the length requirements of the shaft 10.

The opposite end of the tubular shaft 10 is carried by a support 58 having a pilot 60 extending within the shaft 10 and lightly engaging the same. The support 58 is provided with an annular shoulder 62 which abuttingly engages the outer end of shaft 10 and is rotatably mounted on the end of a piston extension 64. An annulus of bearings 63 is interposed between the support 58 and the extension 64. The support 58 and the extension 64 are restrained from axial separation by means of overlaping flanges 65 and 66 thereon respectively.

The piston 67 is adapted to abuttingly engage an inner end wall 69 of the servo-motor 68 to limit the outward travel thereof while the maximum outward position of the support 58 is determined by the threaded adjustment between the piston extension 64 and the piston 67, which adjustment is fixed by an adjusting nut 70 threadedly carried by the extension and adapted to abuttingly engage the piston.

The servo-motor 68 is provided with a solenoid 72 which controls the flow of pressure fluid received by the servo-motor from the source 36 through a fluid passage line 73. The solenoid 72 is adapted to be energized by the timer 42 through the power lines 74. A platform 76 is slidably mounted on the ways 46 and adapted to be fixedly positioned thereon by set screws 78. The position of the platform 76 is dictated by the length requirements of the components to be welded. The servo-motor 68 is fixedly secured to the platform 76 in a suitable manner.

Intermediate the ends of the tubular shaft 10, a platform 90 is slidably carried by the ways 46 and adapted to be secured thereto by set screws 91. As clearly shown in FIG. 4, the platform 90 carries a V-shaped support 92 thereon, which support is rotatably mounted on an adjustable support pin 93 threadedly received in the platform 90 and is adapted to be fixedly positioned relative thereto by the adjusting nut 94 carried by the pin 93.

Surrounding the junction of the tubular shaft 10 and the annular shoulder 18 of the fitting 12 is an induction coil 80 which is shown in a schematic manner. The coil is of the well known split inductor type having a central cooling water opening 81 and is adapted to be opened by the top half separating at 82 and pivoting upwardly at 83 so that the shaft 10 and fitting 12 may be placed within the induction coil. The coil 80 overlaps the junction to an extent sufficient to obtain the desired width of heating effect to the shaft and fitting. The ends of the coil are respectively connected to a generator 84 of high frequency alternating current by means of power lines 86; the generator's supply of power to the coil 80 being controlled by the timer 42 through the lines 88, while the generator is supplied with power from a source of power shown generally at 85.

At the start of operation, the servo-motors 32 and 68 have their pistons 30 and 67 disposed in a withdrawn position, and the coil 80 has been pivoted to its open position. The stub shaft 12 is disposed in the opening 24 of the driving support 26 while the tubular shaft 10 is positioned on the support 58 and on the V-support 92. At this time the coil 80 is closed and the timer 42 is started and sequentially energizes the following operations: the servo-motor 32 is energized and extends the piston 30 to its farthest extended position thereby moving the support 26 and fitting 12 to their proper positions relative to the stationary induction coil 80; the servo-motor 68 is then energized forcing the piston 67 outwardly which in turn forces the shaft 10 onto the butt 14 of the fitting 12 until the end of the shaft 10 engages the annular flange 18 which limits the further inward movement thereof; the servo-motor 68 is de-energized to relieve the same of pressure fluid without withdrawing the piston so that the end load on the abutting shaft 10 and flange 18 is relieved; the motor 48 is energized thereby rotating the driving support 26 which in turn rotates the fitting 12 and shaft 10; the generator 84 is energized and supplies high frequency alternating current to the induction coil 80 which heats the adjoining portions of the shaft 10 and flange 18 of the fitting 12 by induction (the steps of rotating and heating may be energized simultaneously if desired); the power to the induction coil 80 is terminated thereby ending the heating cycle; the motor 48 is stopped thereby terminating rotation of the shaft and fitting (these steps of stopping the heating cycle and stopping rotation may be energized simultaneously if desired); the servo-motor 68 is again energized and the piston 67 is urged outwardly until it engages the shoulder 69 of the servo-motor housing while forcing the heated portions of the shaft 10 and flange 18 together thereby completing the weld; and the servo-motors 32 and 68 are energized to retract their respective pistons 30 and 67. At this time, the coil 80 may be opened and the welded components removed.

In preparing to perform the above operations, the adjustment between the piston extension 28 and the piston 30 must be set so that when the piston is fully extended, the end of the flange 18 which controls the location of the abutment with the shaft 10 is properly positioned relative to the induction coil 80 so that the desired heating location is obtained. The adjustment between the piston extension 64 and the piston 67 must be such that the complete extension of the piston 67 (from the original push-up position) will force the heated portions of the flange 18 and shaft 10 together to the extent necessary to complete the weld as desired. It should be noted that the shaft 10 and flange 18 do not have to be placed in abutting relationship prior to heating; adjoining relationship is sufficient for the purpose of this method as long as the parts are in proper relationship relative to the induction coil.

Referring to FIG. 5, the appearance of the completed weld is shown. The junction of the shaft 10 and flange 18 has been fused together and the final operation of forcing the shaft and flange together has displaced a portion of the fused metal and the adjoining members radially inwardly and outwardly. The provision of the undercut 20 has allowed the inward movement to take place without any restriction or any distortion of the joined components.

Since the adjoining portions of shaft 10 and flange 18 are rotated during the heating cycle, the heating thereof is circumferentially uniform. Further, stopping rotation before the forcing together of the shaft 10 and flange 18 eliminates the possibility of hot tears or hot cracks forming because of stresses induced by rotational forces during the final welding operation.

In FIG. 6 another manner of preparing the undercut is shown. In this embodiment, the fitting 12a does not have a pilot portion on its enlarged end. An undercut 20a is prepared in the enlarged end so that the flange 18a is formed having substantially the same diameter and radial thickness as the shaft 10. The welding operation is adapted to take place according to the same procedure as the one previously described with the exception that there will be no push-up operation but merely a positioning of the flange 18a and the shaft 10 in adjoining relationship prior to welding. The provision of the undercut 20a will allow the welding of the shaft 10 and the flange 20a with no radial interference as previously described with respect to FIG. 5. With this embodiment, it is necessary to drivingly rotate the shaft 10 by a separate means such as driving support 26, since the fitting 12a does not engage the shaft 10.

Referring now to FIGS. 7, 8 and 9, a second embodiment of a manner of practicing this invention is shown wherein a fitting may be simultaneously welded to both ends of the shaft 10. In this embodiment corresponding parts will be designated by the same numerals as used with respect to the embodiment shown in FIG. 1 and similar parts will be designated by the same numeral plus 200.

This embodiment is similar to the embodiment shown in FIG. 1 except for the following differences. The end of the shaft 10 opposite the fitting 12 is shown pressed on to a butt or pilot 96 of another fitting in the form of an end yoke 98. The butt 96 is provided with a relieved area in the form of an undercut 100 so as to provide a flange 102 on the enlarged end of the yoke 98 of substantially the same diameter and radial cross-section as the shaft 10. The outer end of the end yoke 98 is formed with a pair of lugs 104 each having a cross-hole 106 therein disposed in aligned relationship. The lugs 104 are disposed in a central opening 108 in a support 258 with the radial outer surface of the lugs 104 in positioning abutting relationship with the support 258.

The support 258 has a pair of aligned openings 110 disposed in registration with the cross-holes 106 of the lugs 104. A lock pin 112 is positioned in the aligned openings 110 and the cross holes 106 and has an enlarged head 113 engaging the outer surface of the support 258 and a cross pin 114 extending through its lower end to secure the lock pin within the support. The support 258 is rotatably mounted on the piston extension 64 and fixed against axial movement relative thereto by means of the overlapping flanges 65 and 66 carried by the support and extension respectively.

Surrounding the junction of the shaft 10 and the shoulder 102 of the yoke 98 is a second induction coil 280 which is shown in a schematic manner and is of the same construction and operation as the coil 80 previously described. The ends of the coil 280 are connected to the generator 84 by means of power lines 286. The generator's supply of power to the coil 280 is controlled by the timer 242.

Clamping means are provided on the intermediately positioned platform 90 to secure the shaft 10 against axial movement during the final welding operation. More particularly, a pair of servo-motors 116 and 118 of the double acting pressure fluid responsive type are fixedly secured in a suitable manner to the platform 90 in opposed relationship. As clearly shown in FIG. 9, the servomotor 16 is provided with a piston 120 which is adapted to abuttingly engage an end shoulder 121 of the servo-motor housing to limit its outward movement. The piston 120 threadedly receives a piston extension 122 in an adjustable manner and an adjusting nut 123 is provided to secure the adjustment between the same. The piston extension terminates in a clamping portion 124, whose inner end is of concave configuration and adapted to engage the shaft 10. The extension 122 is adjusted relative to the piston 120 whereby upon outward movement of the piston 120 and abutment with the shoulder 121, the piston will position the clamping portion 124 so that the shaft 10 is in a centralized position.

The servo-motor 118 is provided with a piston 126 which terminates in a clamping portion 128 whose inner end is of concave configuration and adapted to engage the shaft 10 and urge the same against the clamp 124. The piston 126 is not limited in its inward travel by the servo-motor housing, but is merely limited by its engagement with the shaft 10 after the same has been positioned by the clamp 124.

The servo-motors 116 and 118 are provided with solenoid valves 130 and 132 respectively which control the flow of pressure fluid to the servo-motors from the source of pressure fluid 36 through a pressure fluid line 134. The solenoids are adapted to be energized by the timer 242 through power lines 136. The servo-motor 116 is adapted to be faster acting than the servo-motor 118 so that upon simultaneous energization of the servo-motors, the clamp 124 of the servo-motor 116 will reach its inward centralizing position against the shaft 10 prior to the clamp 128 of the servo-motor 118.

The operation of the servo-motor 32 in this embodiment differs from that in the embodiment of FIG. 1 in that the position of the piston extension 28 thereof when in the withdrawn position is such that when the fitting 12 is inserted therein, the flange 18 is in proper welding position in the coil 80 so that preliminary movement of the position of the piston 30 is not required to position the flange 18. The position of the coil 280 is selected in accordance with the desired length of the shaft 10, and must, therefore, be of a selectably positionable nature so that it may be moved to accommodate shafts of different lengths. When energized, the piston 30 is adapted to move outwardly and engage a shoulder 269 on the inner end of the housing of the servo-motor 32 which limits the inward travel to that necessary to push the flange 18 and the shaft 10 together to complete the welding operation.

At the start of the operation of this embodiment, the pistons of all the servo-motors are in the withdrawn position and the inductor coils 80 and 280 are pivoted to their open position. The fitting 12 and the yoke 98 are positioned in the supports 26 and 258 respectively and the shaft 10 is placed on the V-support 92. At this time the induction coils 80 and 280 are closed and the timer 242 is started and sequentially energizes the following operations: the servo-motor 68 is energized and extends the piston 67 outwardly to push the butts 96 and 14 of the fittings 98 and 12 respectively into the shaft 10 until the shaft engages the flanges 18 and 102; the servo-motor 68 is then de-energized without withdrawing the piston 67 so that the end load on the abutting shaft 10 and flanges 18 and 102 is relieved; the motor 48 is energized and rotates the driving support 26 which in turn rotates the fitting 12, shaft 10 and fitting 98; the generator 84 is energized and supplies high frequency alternating current to the induction coils 80 and 280 which heat the adjoining portions of the shaft 10 and flanges 18 and 102 by induction (the steps of rotating and heating may be energized simultaneously if desired); the power to the induction coils 80 and 280 is terminated thereby ending the heating cycle; the motor 48 is stopped thereby terminating the rotation of the shaft and fittings (the steps of stopping the heat cycle and rotation may be energized simultaneously if desired); the servo-motors 116 and 118 are energized thereby clamping the shaft 10 between the clamps 124 and 128; the servo-motors 32 and 68 are energized to urge their pistons 30 and 67 respectively outwardly until they engage the shoulders 69 and 269 of the servo-motors housings while forcing the heated portions of the shaft 10 and flanges 18 and 102 together thereby completing the weld; and finally all the servo-motors are energized to retract their pistons. At this time the coils 80 and 280 are opened and the welded components removed.

From the foregoing it is readily apparent that an improved method has been described for welding a fitting to a tubular shaft; which method provides a weld with no weld spatter and wherein undesirable heat and distortion are minimized; wherein circumferential heating and welding effects are uniform; wherein the fitting may have an original greater radial thickness in the vicinity of the proposed weld than the shaft member and wherein the final structure is such that the weld which arises from pressing the components together is radially unconfined.

While only several embodiments of this invention have been shown and described, it is apparent that there may be many changes in the structure, operation, and manner of accomplishing applicant's invention without departing from the scope thereof as defined by the appended claim.

What is claimed is:

A method for welding a tubular shaft to a fitting having an enlarged end and a pilot extending from the enlarged end of smaller diameter than the enlarged end and of slightly greater diameter than the inside diameter of the tubular shaft comprising the steps of providing an undercut in the pilot and the enlarged end of the fitting thereby forming a flange having substantially the same diameter and radial thickness as the tubular shaft and extending axially from the enlarged end of the fitting, pressing the pilot into the end of the shaft in a pressed fit relationship while bringing the end of the shaft and the flange into a spaced adjoining relationship, heating the adjoining portions of the shaft and flange by induction while rotating the same, stopping the heating and rotation, and pressing the heated adjoining portions of the shaft and flange together to complete the weld.

References Cited by the Examiner

UNITED STATES PATENTS

| | | | |
|---|---|---|---|
| 1,246,909 | 11/1917 | Goldschmidt et al. | 29—493 |
| 2,374,270 | 4/1945 | Brock | 287—119 |
| 2,392,824 | 1/1946 | Lytle et al. | 113—130 X |
| 2,447,085 | 8/1948 | Odlum | 287—119 |
| 2,678,370 | 5/1954 | Denneen | 219—9.5 |
| 2,803,732 | 8/1957 | Wade et al. | 219—9.5 |
| 3,065,536 | 11/1962 | Chapman | 29—493 |

FOREIGN PATENTS

| | | |
|---|---|---|
| 546,737 | 7/1942 | Great Britain. |
| 760,740 | 11/1956 | Great Britain. |

JOHN F. CAMPBELL, *Primary Examiner.*